No. 852,317. PATENTED APR. 30, 1907.
W. B. COLE.
HORSESHOE CALK.
APPLICATION FILED AUG. 25, 1906.

Witnesses
Frank Hough
F. P. Bringer

Inventor
Wm. B. Cole

By Victor J. Evans
Attorney

UNITED STATES PATENT OFFICE.

WILLIAM B. COLE, OF RHINEBECK, NEW YORK.

HORSESHOE-CALK.

No. 852,317.  Specification of Letters Patent.  Patented April 30, 1907.

Application filed August 25, 1906. Serial No. 332,033.

*To all whom it may concern:*

Be it known that I, WILLIAM B. COLE, a citizen of the United States of America, residing at Rhinebeck, in the county of Dutchess and State of New York, have invented new and useful Improvements in Horseshoe-Calks, of which the following is a specification.

This invention relates to horseshoe calks, and the principal object of the same is to provide a horseshoe calk in which certain portions will wear away in use and always leave projections for preventing the horse from slipping.

Another object of my invention is to provide a practically self-sharpening toe or heel calk for horseshoes.

These and other objects are attained by means of the construction illustrated in the accompanying drawing, in which:—

Figure 1:
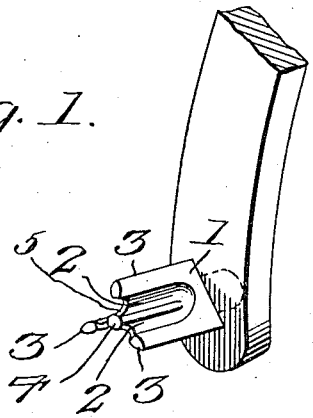
Figure 2:
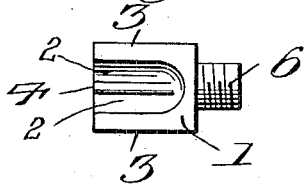

Figure 1 is a perspective view of a portion of a horseshoe having a calk secured thereto made in accordance with my invention. Fig. 2 is a side view of the calk removed from the shoe.

Referring to the accompanying drawing for a more particular description of my invention, the numeral 1 designates the body portion of the calk provided with three radially disposed wings 2, said wings each terminating in an oppositely beveled outer enlarged spur 3. The wings 2 extend from a central enlarged rib 4, and between said central rib and the spurs 3 the wings are cut away, as at 5. A threaded shank 6 is formed on the base of the calk for securing the same to a horseshoe. It is to be noted that the wings 2 are comparatively thin and that these wings will in use wear away more quickly than the spurs 3 or the central rib 4, the result of which is that the calk is always sharp, and the spurs 3 and central rib 4 will always project slightly beyond the wing portions 2.

As shown in Fig. 2 the wings 2 extend to the outer face of the calk, and are not cut away as at 2 in Fig. 1. Such a calk has been found very desirable for use on city streets or on hard pavements.

From the foregoing it will be obvious that my horseshoe calks can be of made hardened steel at a slight cost, and they can be attached to any ordinary horseshoe. In use, the wings will wear away and leave projecting spurs to prevent the horse from slipping.

Having thus described the invention, what is claimed as new, is:—

1. A horseshoe calk comprising a central rib, thin radial wings extending outward from said rib, said wings each terminating in enlarged oppositely beveled spurs having plane outer ends.

2. A horseshoe calk comprising a central enlarged rib, radially extending wings, said wings terminating in enlarged spurs having oppositely beveled sides, and said wings being cut away, as at 5, substantially as described.

3. A horseshoe calk provided with an enlarged central rib, thin radial wings extending from said rib, said wings terminating in enlarged oppositely beveled spurs and said wings being cut away, substantially as described.

4. A horseshoe calk comprising a threaded shank, a central rib, thin wings extending radially from said rib and terminating in oppositely beveled spurs, said spurs and central rib extending beyond the wings, substantially as described.

In testimony whereof, I affix my signature in presence of two witnesses.

WILLIAM B. COLE.

Witnesses:
 ROSWELL COLE,
 EARL COLE.